United States Patent
Wolff et al.

(10) Patent No.: US 10,789,950 B2
(45) Date of Patent: Sep. 29, 2020

(54) USER DEDICATED AUTOMATIC SPEECH RECOGNITION

(71) Applicant: NUANCE COMMUNICATIONS, INC., Burlington, MA (US)

(72) Inventors: Tobias Wolff, Neu Ulm (DE); Markus Buck, Biberach (DE); Tim Haulick, Blaubeuren (DE); Suhadi, Stuttgart (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 15/876,545

(22) Filed: Jan. 22, 2018

(65) Prior Publication Data
US 2018/0158461 A1 Jun. 7, 2018

Related U.S. Application Data

(63) Continuation of application No. 14/382,839, filed as application No. PCT/US2012/029359 on Mar. 16, 2012, now abandoned.

(51) Int. Cl.
| | | |
|---|---|---|
| G10L 15/22 | (2006.01) | |
| G10L 15/28 | (2013.01) | |
| G06F 3/16 | (2006.01) | |
| G10L 25/51 | (2013.01) | |
| G10L 15/183 | (2013.01) | |
| G10L 21/0216 | (2013.01) | |

(52) U.S. Cl.
CPC .............. *G10L 15/22* (2013.01); *G06F 3/167* (2013.01); *G10L 15/28* (2013.01); *G10L 25/51* (2013.01); *G10L 15/183* (2013.01); *G10L 2015/228* (2013.01); *G10L 2021/02166* (2013.01)

(58) Field of Classification Search
None
See application file for complete search history.

(56) References Cited

U.S. PATENT DOCUMENTS 6,125,341 A * 9/2000 Raud ...................... G10L 15/26
704/8
6,556,970 B1 * 4/2003 Sasaki ................ G01C 21/3608
382/100

(Continued)

FOREIGN PATENT DOCUMENTS

| CN | 1342967 | 4/2002 |
|---|---|---|
| CN | 102030008 | 4/2011 |

(Continued)

OTHER PUBLICATIONS

International Search Report PCT/US2012/029359 filed on Mar. 16, 2012, 3 pages.

(Continued)

*Primary Examiner* — Jonathan C Kim
(74) *Attorney, Agent, or Firm* — Onello & Mello, LLP

(57) ABSTRACT

A multi-mode voice controlled user interface is described. The user interface is adapted to conduct a speech dialog with one or more possible speakers and includes a broad listening mode which accepts speech inputs from the possible speakers without spatial filtering, and a selective listening mode which limits speech inputs to a specific speaker using spatial filtering. The user interface switches listening modes in response to one or more switching cues.

20 Claims, 6 Drawing Sheets

(56) References Cited

U.S. PATENT DOCUMENTS

| | | | | |
|---|---|---|---|---|
| 7,355,508 | B2* | 4/2008 | Mian | B60R 25/00 340/426.1 |
| 7,813,822 | B1* | 10/2010 | Hoffberg | G06K 9/00369 381/73.1 |
| 8,666,047 | B2* | 3/2014 | Rambo | H04M 9/10 348/14.08 |
| 8,700,392 | B1* | 4/2014 | Hart | G10L 15/25 704/231 |
| 8,818,800 | B2* | 8/2014 | Fallat | G10L 21/02 381/94.1 |
| 2004/0267518 | A1* | 12/2004 | Kashima | G10L 15/06 704/9 |
| 2006/0200253 | A1* | 9/2006 | Hoffberg | H04N 5/782 700/19 |
| 2007/0038436 | A1* | 2/2007 | Cristo | G06F 40/232 704/9 |
| 2008/0162120 | A1* | 7/2008 | Mactavish | G10L 21/06 704/201 |
| 2008/0253589 | A1* | 10/2008 | Trahms | G01S 7/52084 381/110 |
| 2009/0055170 | A1* | 2/2009 | Nagahama | G10L 15/20 704/226 |
| 2009/0055180 | A1* | 2/2009 | Coon | B60R 16/0373 704/251 |
| 2009/0066798 | A1* | 3/2009 | Oku | H04N 5/232 348/207.99 |
| 2009/0164212 | A1* | 6/2009 | Chan | G10L 21/0208 704/226 |
| 2009/0198495 | A1* | 8/2009 | Hata | H04R 27/00 704/246 |
| 2009/0204410 | A1* | 8/2009 | Mozer | G10L 15/30 704/275 |
| 2010/0215184 | A1* | 8/2010 | Buck | H04R 3/002 381/66 |
| 2010/0217590 | A1* | 8/2010 | Nemer | G01S 3/8006 704/233 |
| 2010/0304731 | A1* | 12/2010 | Bratton | H04N 7/185 455/420 |
| 2011/0083075 | A1 | 4/2011 | Robinson et al. | |
| 2011/0161076 | A1* | 6/2011 | Davis | G06F 3/0488 704/231 |
| 2011/0244919 | A1* | 10/2011 | Aller | G06Q 30/0281 455/556.1 |
| 2013/0060571 | A1* | 3/2013 | Soemo | G06F 3/011 704/251 |
| 2015/0046157 | A1 | 2/2015 | Wolff et al. | |

FOREIGN PATENT DOCUMENTS

| | | | |
|---|---|---|---|
| CN | 102237086 | | 11/2011 |
| EP | 1 400 814 | A2 | 3/2004 |
| EP | 1400814 | A2 * | 3/2004 ............ G10L 25/78 |
| EP | 1695873 | A1 * | 8/2006 ......... B60R 16/0373 |
| EP | 2 028 062 | A2 | 2/2009 |
| JP | 2003-114699 | | 4/2003 |
| JP | 2004-515982 | | 5/2004 |
| JP | 2004-184803 | | 7/2004 |
| JP | 2004-109361 | | 8/2004 |
| JP | 2006-504130 | | 2/2006 |
| JP | 2009-020352 | | 1/2009 |
| JP | 2011-61461 | | 3/2011 |
| WO | WO 03/107327 | A1 | 12/2003 |

OTHER PUBLICATIONS

Notification Concerning Transmittal of International Preliminary Report on Patentability (Chapter 1 of the Patent Cooperation Treaty), PCT/US2012/029359, dated Sep. 25, 2014, 9 pages.
Korean Notice of Preliminary Rejection (with English translation) dated Sep. 8, 2015; for Korean Pat. App. No. 10-2014-7025374; 9 pages.
Japanese Patent Application No. 2015-500412 Official Action dated Sep. 11, 2015, including English translation, 13 pages.
Application No. 2015-500412 Response filed on Dec. 8, 2015 with translation of amended claims 13 pages.
Application No. 10-2014-7025374 Response filed on Dec. 11, 2015 with translation of amended claims 16 pages.
European Patent Application No. 12 710 851.2-1910 Office Action dated Feb. 26, 2016, 6 pages.
Korean Patent Application No. 10-2014-7025374 Notice of Final Rejection dated Apr. 27, 2016, including English translation, 5 pages.
Japanese Final Office Action (with English Translation) dated May 26, 2016 corresponding to Japanese Application No. 2015-500412; 7 Pages.
Korean Notice of Allowance (with English Reporting Letter) dated Jun. 28, 2016 corresponding to Korean Application No. 10-2014-7025374; 4 Pages.
Response (with Reporting Letter and Amended Claims in English) to Korean Final Office Action dated Apr. 27, 2016 corresponding to Korean Application No. 10-2014-7025374; Response filed on May 27, 2016; 20 Pages.
Response to Office Action dated Feb. 26, 2016 corresponding to European Application No. 12710851.2; Response filed on Jun. 22, 2016; 10 Pages.
Korean Application No. 10-2014-7025374 Allowance Report dated Jun. 28, 2016, including English translation of allowed claims, 6 pages.
European Application No. 12710851.2 Intention to Grant dated Sep. 14, 2016, 7 pages.
Chinese Office Action including Search Report (with English translation) dated Sep. 27, 2016; for Chinese Pat, App. No. 201280071506.0; 14 pages.
Response (with English Amended Claims) to Chinese Office Action dated Sep. 27, 2016 for Chinese Application No. 201280071506.0; Response filed on Jan. 13, 2017; 21 Pages.
Chinese Office Action (with English translation) dated May 22, 2017; for Chinese Pat. App. No. 201280071506.0; 11 pages.
Chinese Response with English translation filed Aug. 4, 2017 to the Office Action dated May 22, 2017; for Chinese Pat. App.: 201280071506.0; 19 pages.
U.S. Non-Final Office Action dated Nov. 3, 2015 corresponding to U.S. Appl. No. 14/382,839; 11 Pages.
Response to U.S. Non-Final Office Action dated Nov. 3, 2015 corresponding to U.S. Appl. No. 14/382,839; Response filed Nov. 25, 2015; 10 Pages.
U.S. Final Office Action dated Apr. 14, 2016 corresponding to U.S. Appl. No. 14/382,839; 18 Pages.
Appeal Brief filed Sep. 20, 2016 corresponding to U.S. Appl. No. 14/382,839; 15 Pages.
Examiner's Answer to Appeal Brief dated Dec. 2, 2016 corresponding to U.S. Appl. No. 14/382,839; 4 Pages.
Reply Brief filed Jan. 30, 2017 corresponding to U.S. Appl. No. 14/382,839; 8 Pages.
Examiner's Decision to Appeal dated Sep. 5, 2017 corresponding to U.S. Appl. No. 14/382,839; 17 Pages.
Chinese 3$^{rd}$ Office Action (with English Translation) dated Nov. 27, 2017 corresponding to Chinese Appl. No. 201280071506.0; 12 Pages.
Response (with English Translation) to Chinese Third Office Action dated Nov. 27, 2017 for Chinese Application No. 201280071506.0; Response filed Apr. 12, 2018; 21 Pages.
4$^{th}$ Chinese Office Action (with English Translation) dated Aug. 7, 2018 for Chinese Application No. 201280071506.0; 12 Pages.
Response (with English Translation and Amended Claims) to Chinese Office Action dated Aug. 7, 2018 for Chinese Application No. 201280071506.0; Response filed Nov. 22, 2018; 18 Pages.

* cited by examiner

USER DEDICATED AUTOMATIC SPEECH RECOGNITION

CROSS REFERENCE TO RELATED APPLICATIONS

The present application is a continuation of U.S. patent application Ser. No. 14/382,839, entitled: "USER DEDICATED AUTOMATIC SPEECH RECOGNITION" which was filed on Sep. 4, 2014, and a National Stage application of PCT/US2012/029359 filed on Mar. 16, 2012, and entitled "USER DEDICATED AUTOMATIC SPEECH RECOGNITION", which applications are incorporated herein by reference in their entirety.

TECHNICAL FIELD

The present invention relates to user interfaces for computer systems, and more specifically to a user dedicated, multi-mode, voice controlled interface using automatic speech recognition.

BACKGROUND ART

In voice controlled devices, automatic speech recognition (ASR) typically is triggered using a push-to-talk (PTT) button. Pushing the PTT button makes the system respond to any spoken word inputs regardless of who uttered the speech. In distant talking applications such as voice controlled televisions or computer gaming consoles, the PTT button may be replaced by an activation word command. In addition, there may be more than one user that may potentially want to do voice control.

ASR systems typically are equipped with a signal pre-processor to cope with interference and noise. Often multiple microphones are used, particularly for distant talking interfaces where the speech enhancement algorithm is spatially steered towards the assumed direction of the speaker (beamforming). Consequently, interferences from other directions will be suppressed. This improves the ASR performance for the desired speaker, but decreases the ASR performance for others. Thus the ASR performance depends on the spatial position of the speaker relative to the microphone array and on the steering direction of the beamforming algorithm.

SUMMARY

Embodiments of the present invention are directed to a multi-mode voice controlled user interface for an automatic speech recognition (ASR) system employing at least one hardware implemented computer processor, and corresponding methods of using such an interface. The user interface is adapted to conduct a speech dialog with one or more possible speakers and includes a broad listening mode which accepts speech inputs from the possible speakers without spatial filtering, and a selective listening mode which limits speech inputs to a specific speaker using spatial filtering. The user interface switches listening modes in response to one or more switching cues.

The broad listening mode may use an associated broad mode recognition vocabulary and the selective listening mode uses a different associated selective mode recognition vocabulary. The switching cues may include one or more mode switching words from the speech inputs, one or more dialog states in the speech dialog, and/or one or more visual cues from the possible speakers. The selective listening mode may use acoustic speaker localization and/or image processing for the spatial filtering.

The user interface may operate in selective listening mode simultaneously in parallel for each of a plurality of selected speakers. In addition or alternatively, the interface may be adapted to operate in both listening modes in parallel, whereby the interface accepts speech inputs from any user in the room in the broad listening mode, and at the same time accepts speech inputs from only one selected speaker in the selective listening mode.

Embodiments of the present invention also include a device for automatic speech recognition (ASR) that includes a voice controlled user interface employing at least one hardware implemented computer processor. The user interface is adapted to conduct a speech dialog with one or more possible speakers. A user selection module is in communication with the user interface for limiting the user interface using spatial filtering based on image processing of the possible speakers so as to respond to speech inputs from only one specific speaker.

The spatial filtering may be further based on selective beamforming of multiple microphones. The user interface may be further adapted to provide visual feedback to indicate a direction of the specific speaker and/or the identity of the specific speaker. The image processing may include performing gesture recognition of visual images of the possible speakers and/or facial recognition of visual images of the faces of the possible speakers.

DETAILED DESCRIPTION

Embodiments of the present invention are directed towards user dedicated ASR which limits the voice control functionality to one selected user rather than to any user who happens to be in the vicinity. This may be based, for example, on a user speaking a special activation word that invokes the user limiting functionality. The system may then remain dedicated to the designated user until a specific dialog ends or some other mode switching event occurs. While operating in user dedicated mode, the system does not respond to any spoken inputs from other users (interfering speakers).

More particularly, embodiments of the present invention include a user-dedicated, multi-mode, voice-controlled interface using automatic speech recognition with two different kinds of listening modes: (1) a broad listening mode that responds to speech inputs from any user in any direction, and (2) a selective listening mode that limits speech inputs to a specific speaker in a specific location. The interface system can switch modes based on different switching cues: dialog-state, certain activation words, or visual gestures. The different listening modes may also use different recognition vocabularies, for example, a limited vocabulary in broad listening mode and a larger recognition vocabulary in selective listening mode. To limit the speech inputs to a specific speaker, the system may use acoustic speaker localization and/or video processing means to determine speaker position.

Embodiments of the present invention also include an arrangement for automatic speech recognition (ASR) which is dedicated to a specific user which does not respond to any other user. Potential users are detected by means of image processing using images from one or more cameras. Image processing may rely on detection of one or more user cues to determine and select the dedicated user, for example, gesture recognition, facial recognition, etc. Based on the results of such user selection, the steering direction of the acoustic spatial filter can be controlled, continuing to rely on ongoing visual information. User feedback (via a GUI) can be given to identify the direction and/or identity of the selected dedicated user, for example, to indicate the spatial steering direction of the system.

Figure 1:
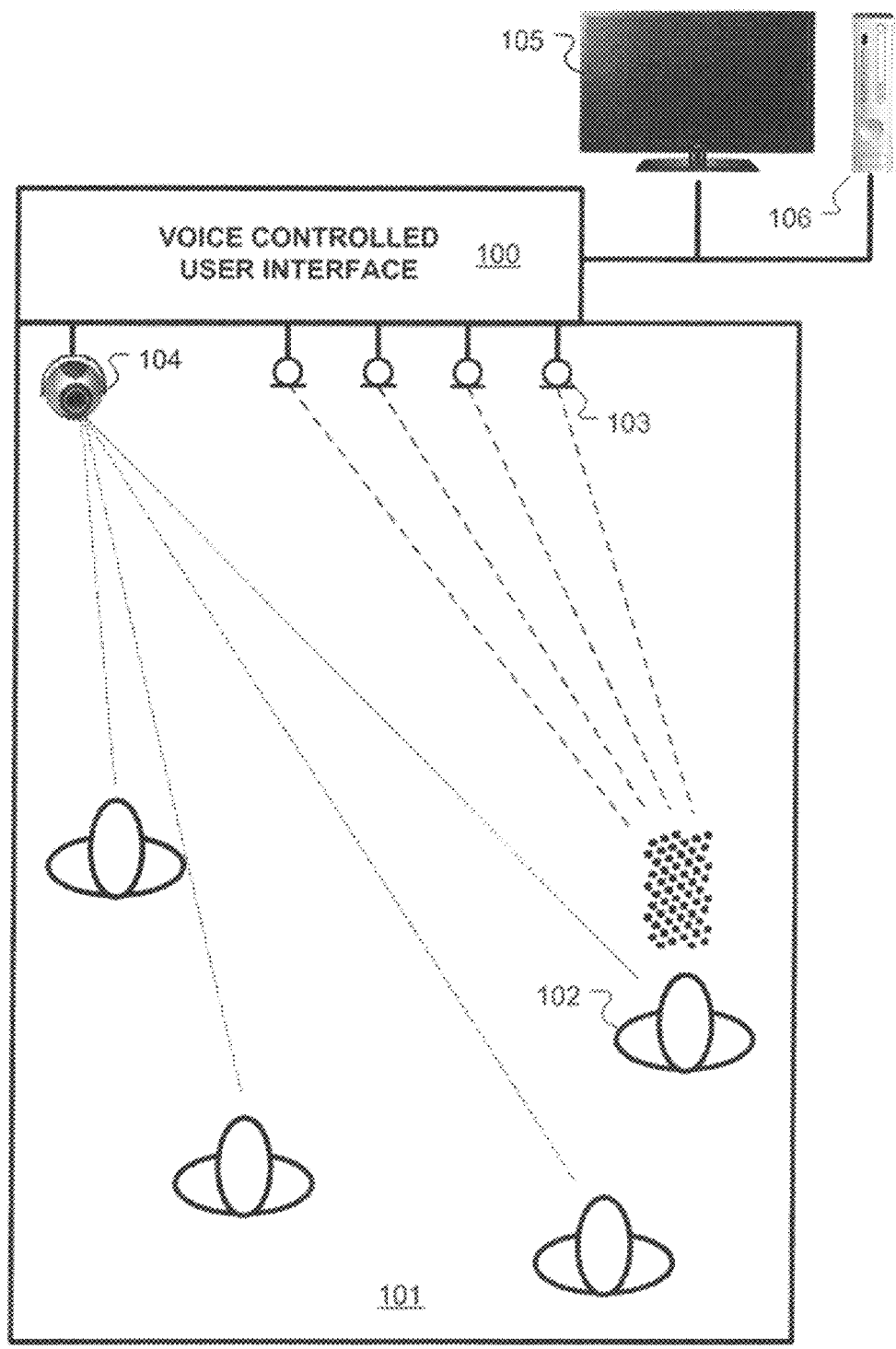
FIG. 1 shows an arrangement for using a voice controlled user interface according to an embodiment of the present invention.

FIG. 1 shows an arrangement for a voice controlled user interface 100 according to an embodiment of the present invention. The voice controlled user interface 100 includes at least two different operating modes. There is a broad listening mode in which the voice controlled user interface 100 broadly accepts speech inputs without any spatial filtering from any one of multiple speakers 102 in a room 101. In broad listening mode the voice controlled user interface 100 uses a limited broad mode recognition vocabulary that includes a selective mode activation word. When the voice controlled user interface 100 detects the activation word, it enters a selective listening mode that uses spatial filtering to limit speech inputs to a specific speaker 102 in the room 101 using an extended selective mode recognition vocabulary. For example, the selected specific speaker may use the voice controlled user interface 100 in the selective listening mode following a dialog process to control one or more devices such as a television 105 and/or a computer gaming console 106.

Figure 2:
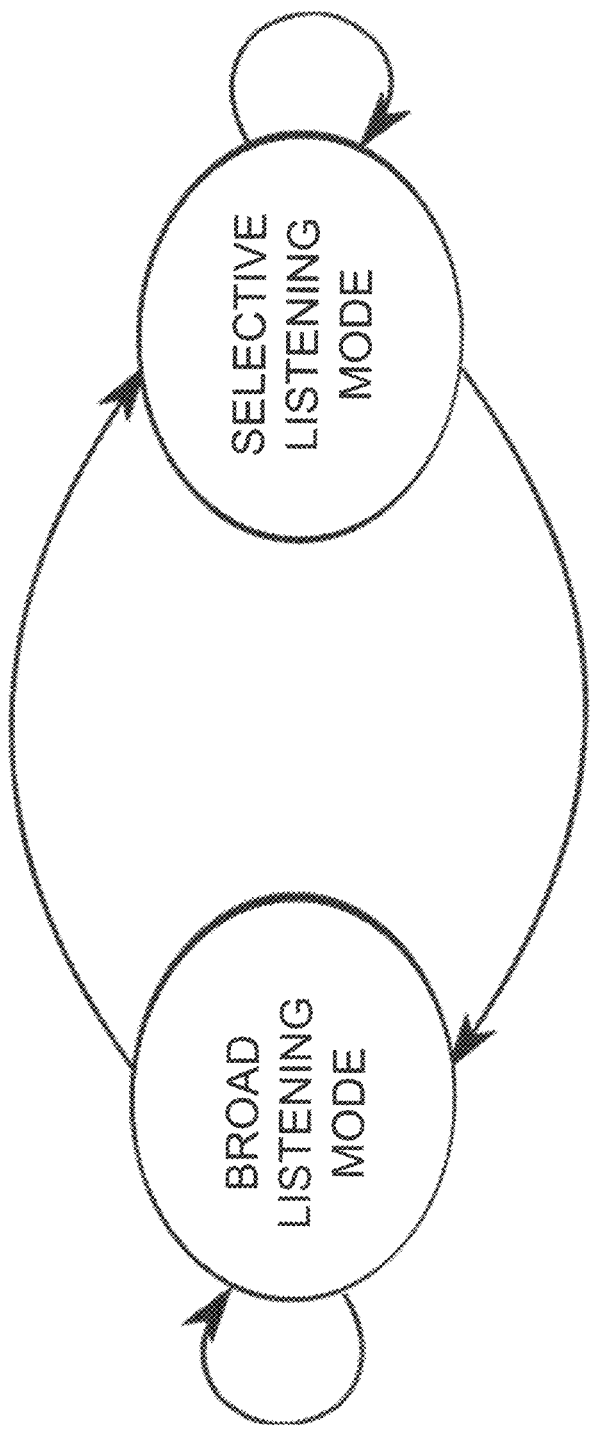
FIG. 2 shows a state diagram for a user dedicated voice controlled user interface according an embodiment of the present invention.

FIG. 2 shows a state diagram for the operation of the voice controlled user interface 100. Starting in broad listening mode on the left side of FIG. 2, the closed arc on the far left shows that the voice controlled user interface 100 stays in broad listening mode so long as the activation word is not detected and a specific speaker has not been identified. The arc on top of FIG. 2 shows the transition from broad listening mode to selective listening mode that occurs when the voice controlled user interface 100 detects that the activation word has been spoken and a specific speaker is successfully identified. When in selective listening mode, the closed arc on the far right side of FIG. 2 shows that the voice controlled user interface 100 stays in selective listening mode so long as the location of the specific speaker is known, until either a dialog process with the speaker ends or some other event changes the mode back to broad listening mode as shown by the arc across the bottom of FIG. 2.

Figure 3:
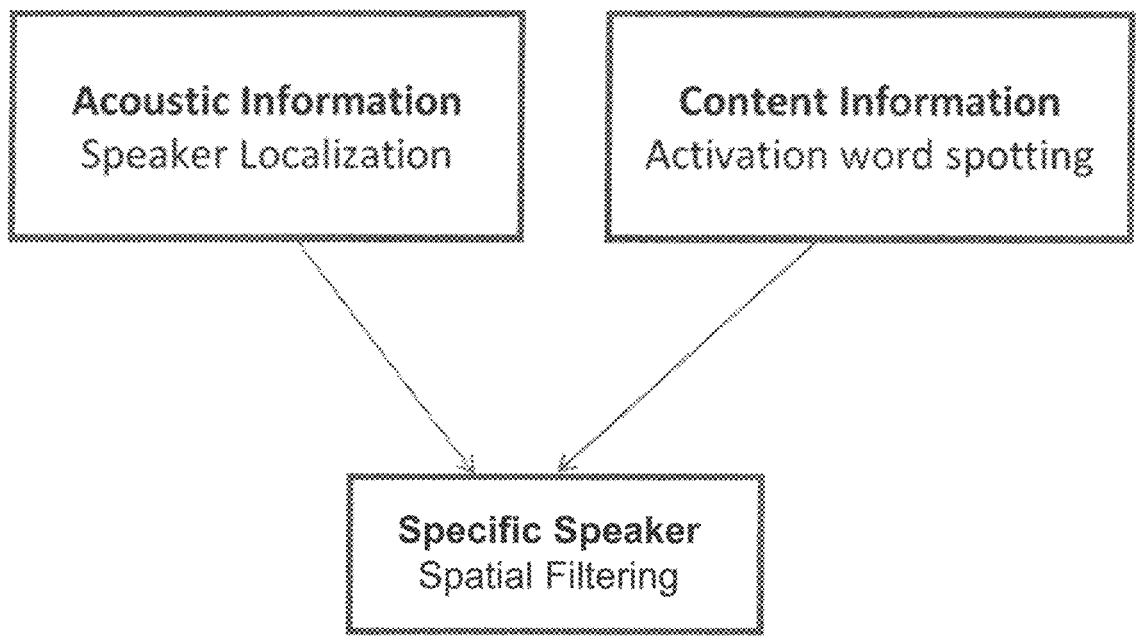
FIG. 3 shows using acoustic and content information to select a given speaker as the active user.

The spatial filtering of a specific speaker performed in selective listening mode may be based on a combination of content information together with acoustic information, as shown in FIG. 3. Content information is present when the activation word is spotted in broad listening mode. Acoustic information is present when acoustic speaker localization is performed by the interface to select speech inputs from multiple microphones in the room and perform selective beamforming of the microphone signals to localize the speech inputs to a specific speaker.

Figure 4:
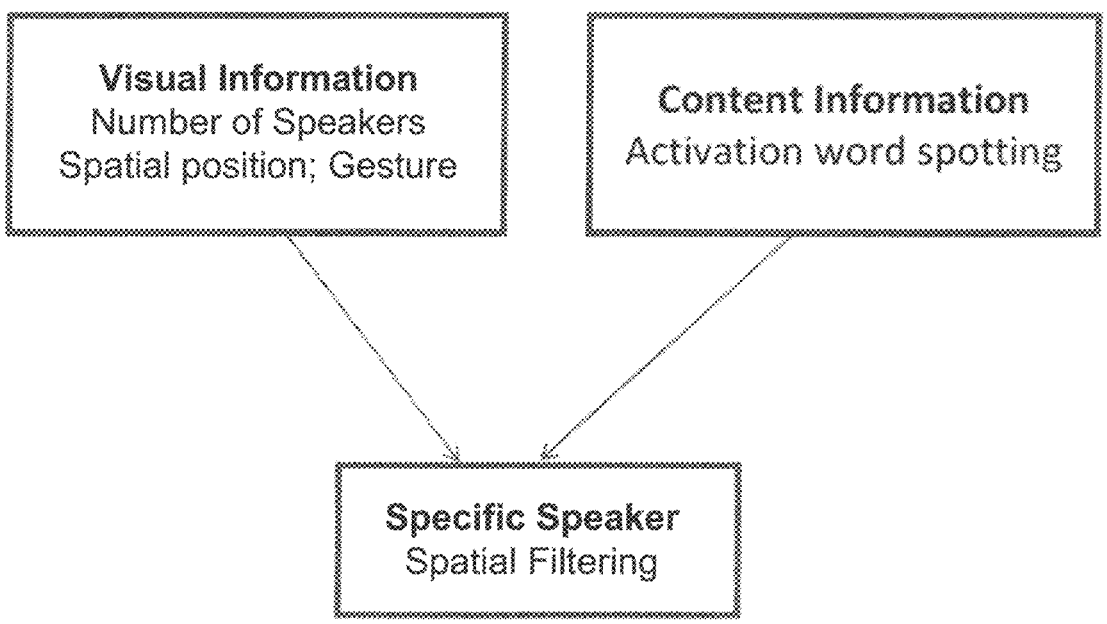
FIG. 4 shows using visual information to select a given speaker as the active user.
Figure 5:
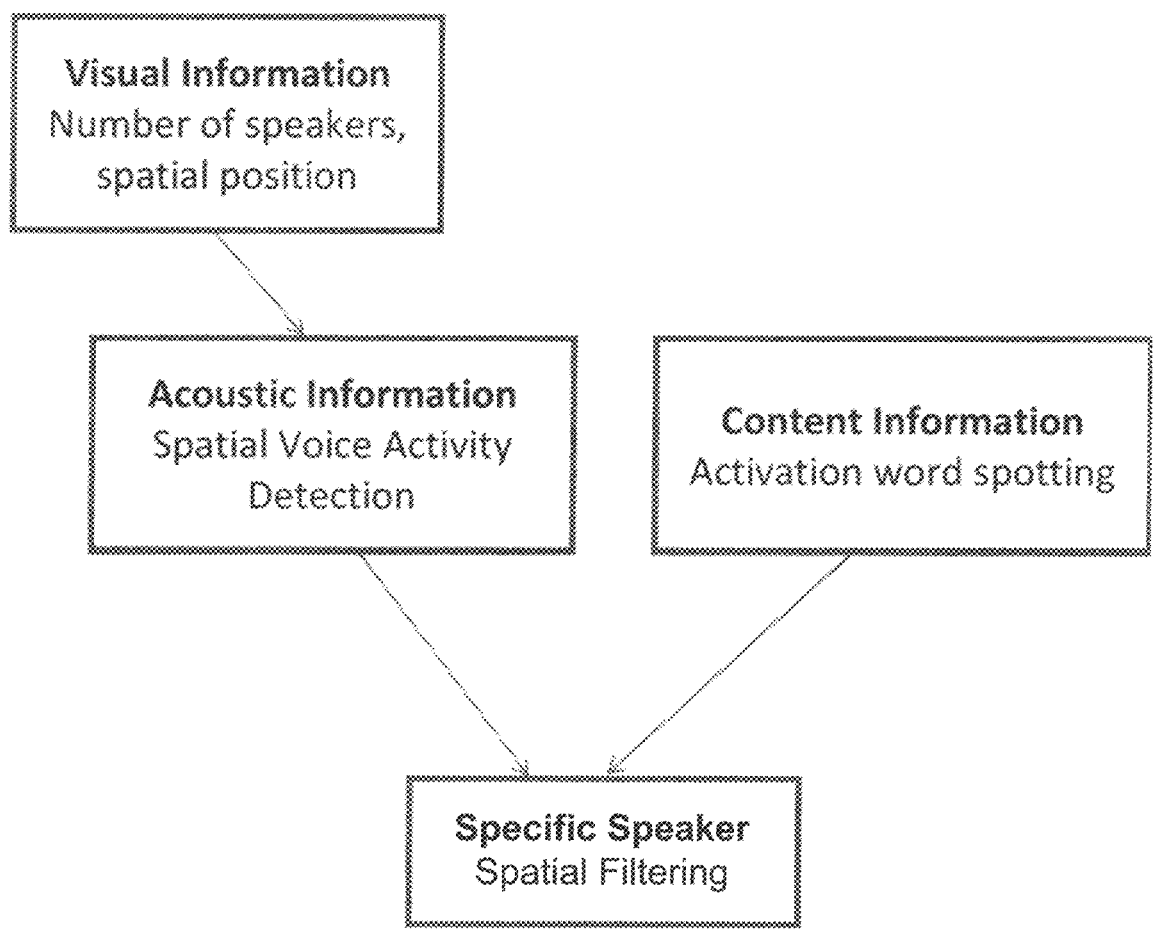
FIG. 5 shows using a combination of visual, acoustic and content information to select a given speaker as the active user.

As shown in FIG. 4, the selective listening mode also may be entered based on using image processing with the spatial filtering. Once the activation word has been detected in broad listening mode, the interface may use visual image information from a camera and/or a video processing engine to determine how many persons are visible and what their position relative to the microphone array is. The interface may select a specific speaker by using the image processing together with gesture recognition to recognize a specific gesture in combination with the activation word. Embodiments using image processing can track the position of the specific speaker even when no commands are being spoken. And as shown in FIG. 5, some embodiments may perform the spatial filtering using a combination of acoustic, image and content information.

Figure 6:
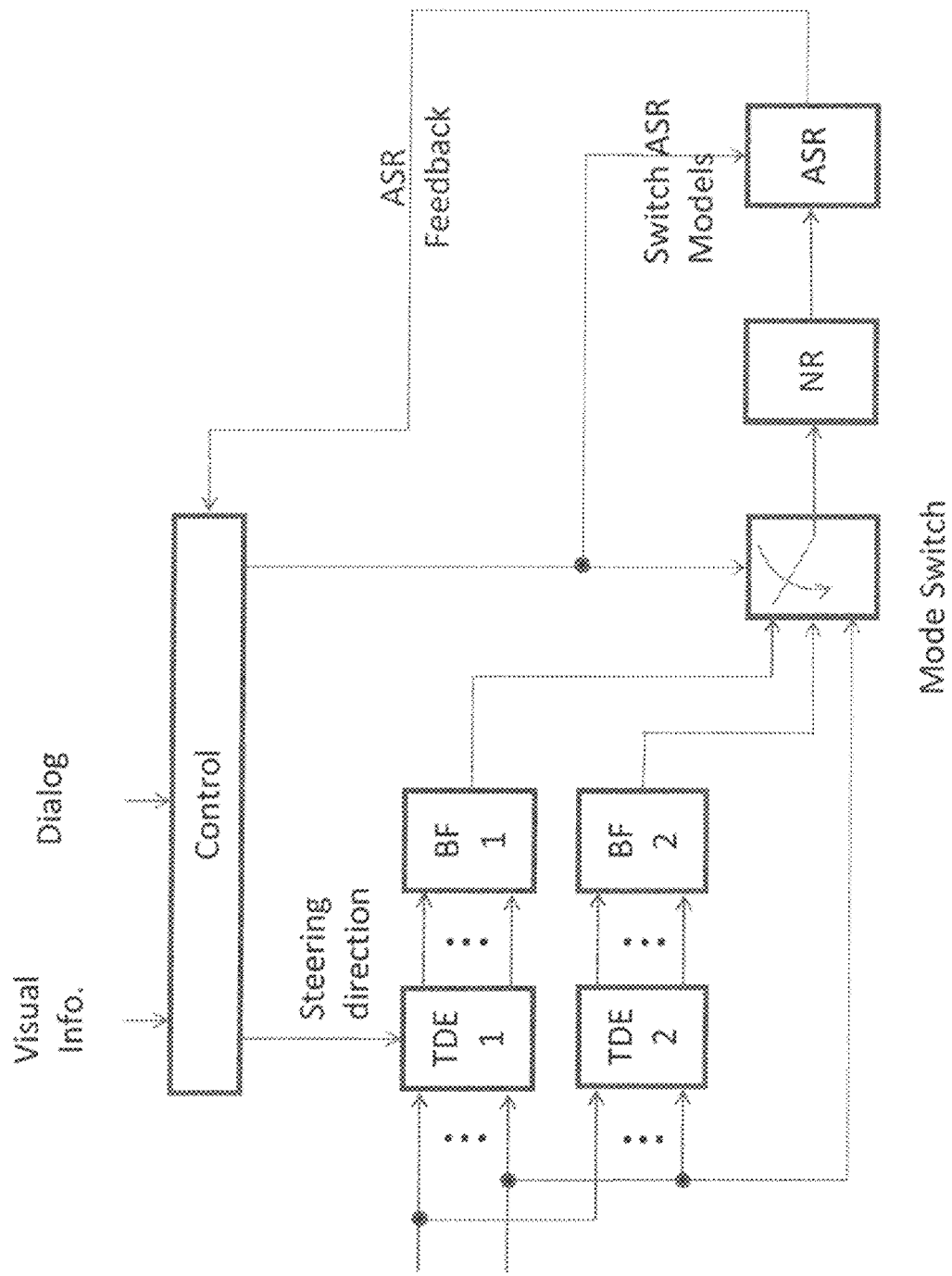
FIG. 6 shows a sequential arrangement for a voice control interface having sequential alternate modes of operation.

FIG. 6 shows functional blocks in a multimode voice controlled user interface which sequentially switches between listening modes. In such an arrangement, the broad listening mode may be engaged in response to the specific speaker completing a speech dialog with the interface in selective listening mode such that the interface sequentially alternates between the listening modes. As a result, only one user at time can operate the interface. In broad listening mode, a control module in the interface uses a mode select switch to select a single microphone in the room to accept speech inputs from anyone in the room. After applying noise reduction (NR), automatic speech recognition (ASR) is performed using the limited broad mode recognition vocabulary (a limited set of recognition models) that includes a selective mode activation word. A feedback signal is provided from the ASR to the control module when the activation word is detected by the ASR. The control module then uses visual information and dialogue state information to spatially filter the microphone array inputs through time delay estimation (TDE) and user-specific beamforming (BF1, BF2, etc.) to keep the interface focus on the selected specific speaker who was determined to have activated the selective listening mode for as long as the user dialog continues.

Figure 7:
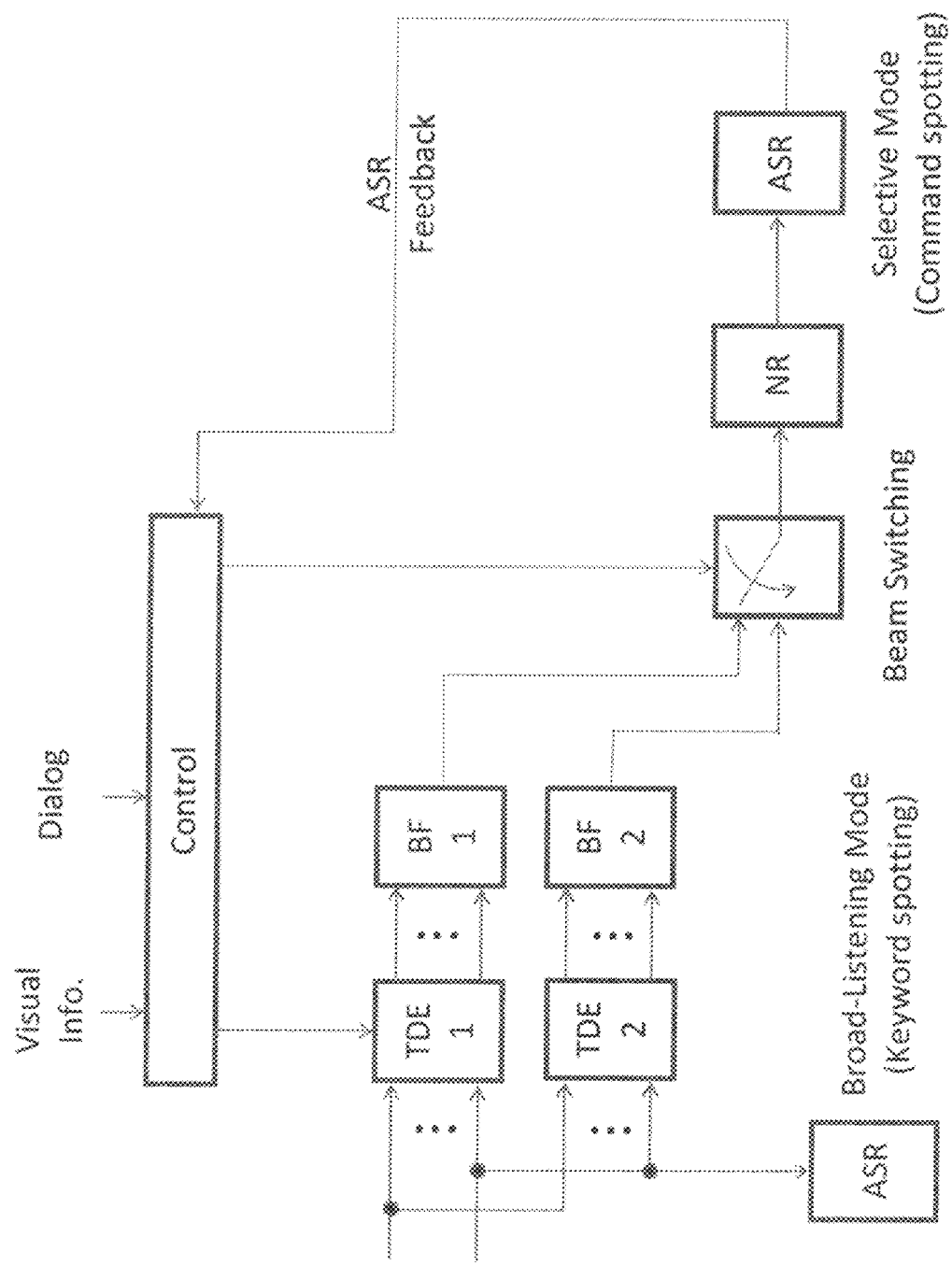
FIG. 7 shows a parallel arrangement for a voice control interface having simultaneous parallel

FIG. 7 shows functional blocks in a multimode voice controlled user interface which processes user speech inputs in parallel while operating in different listening modes. Thus the interface operates in broad listening mode to accept speech inputs from any user in the room using the limited broad mode recognition vocabulary broad listening mode, and at the same time, operates in selective listening mode for one or more specific speakers to accept speech inputs using the extended selective listening mode recognition vocabulary. Even when one user already operates the system in the selective mode, the interface is open for other users in broad and/or selective listening mode. Thus, another user can start a second selective mode instance, for example, to start a separate dialogue or to participate in the currently existing dialogue (e.g., for computer gaming) while multiple directional sensing beams are aimed at each speaker. This could support dialogs with multiple speakers, as for example, in a quiz-gaming application.

Depending on the listening mode, different acoustic models may be used in the ASR engine or even different ASR engines may be used. Either way, the ASR grammar needs to be switched when switching listening modes. For some number of multiple users M, there may either be N=M beams, N<M beams or N=1 beam used by the interface.

It may be useful for the interface to communicate to the specific speaker when the device is in selective listening mode and listening only to him. There are several different ways in which this can be done. For example, a visual display may show a schematic image of the room scene with user highlighting to identify the location of the selected specific speaker. Or more simply, a light bar display can be intensity coded to indicate that spatial direction of the selected specific speaker. Or an avatar may be used to deliver listening mode feedback as part of a dialog with the user(s).

For example, one useful application of the foregoing would be in the specific context of controlling a television or gaming console based on user dedicated ASR with broad and selective listening modes where potential users and their spatial positions are detected by means of one or more cameras. Initially, the interface system is in broad listening mode and potential user information is provided to a spatial voice activity detection process that checks speaker positions for voice activity. When the broad listening mode detects the mode switching cue, e.g. the activation word, the spatial voice activity detection process provides information about who provided that switching cue. The interface system then switches to selective listening mode by spatial filtering (beamforming and/or blind source separation) and dedicates/limits the ASR to that user. User feedback is also provided over a GUI as to listening direction, and from then on the spatial position of the dedicated user is followed by the one or more cameras. A mode transition back to broad listening mode may depend on dialog state or another switching cue.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A device for automatic speech recognition (ASR) comprising:
   a multi-mode voice-controlled user interface employing at least one hardware implemented computer processor, wherein the user interface is adapted to conduct a speech dialog with one or more possible speakers and includes:
      a broad listening mode which accepts speech inputs from the possible speakers without spatial filtering and has an associated limited broad mode recognition vocabulary; and
      a selective listening mode which limits speech inputs to a specific speaker using spatial filtering and has an associated selective mode recognition vocabulary that is larger than the limited broad mode recognition vocabulary,
   wherein the user interface is adapted to:
      switch from the broad listening mode to the selective listening mode in response to one or more switching cues,
      in the selective listening mode, engage the specific speaker in a dialog using the selective mode recognition vocabulary, and
      the user interface is adapted to remain in the selective listening mode so long as a location of the specific speaker is known.

2. A device according to claim 1, wherein the switching cues include one or more mode switching words from the speech inputs.

3. A device according to claim 1, wherein the switching cues include one or more dialog states in the speech dialog.

4. A device according to claim 1, wherein the switching cues include one or more visual cues from the possible speakers.

5. A device according to claim 1, wherein the selective listening mode uses acoustic speaker localization for the spatial filtering.

6. A device according to claim 1, wherein the selective listening mode uses image processing for the spatial filtering.

7. A device according to claim 1, wherein the user interface operates in the selective listening mode simultaneously in parallel for each of a plurality of selected speakers, so that each of the plurality of selected speakers has its own selective listening mode and dialog with the user interface.

8. A device according to claim 1, wherein the user interface is adapted to operate in both listening modes in parallel, whereby the user interface accepts speech inputs in the broad listening mode, and at the same time accepts speech inputs from at least one selected speaker in at least one selective listening mode.

9. The device according to claim 1, wherein the user interface is adapted to switch from the selective listening mode to the broad listening mode in response to either an end of the dialog or an activation word.

10. A computer program product encoded in a non-transitory computer-readable medium for operating an automatic speech recognition (ASR) system, the product comprising:
program code executable to conduct a speech dialog with one or more possible speakers via a multi-mode voice-controlled user interface adapted to:
accept speech inputs from the possible speakers in a broad listening mode without spatial filtering, the broad listening mode having an associated limited broad mode recognition vocabulary; and
limit speech inputs to a specific speaker in a selective listening mode using spatial filtering, the selective listening mode having an associated selective mode recognition vocabulary that is larger than the limited broad mode recognition vocabulary,
wherein the program code is executable to cause the user interface to:
switch from the broad listening mode to the selective listening mode in response to one or more switching cues,
in the selective listening mode, engage the specific speaker in a dialog using the selective mode recognition vocabulary, and
the program code is executable to cause the user interface to remain in the selective listening mode so long as a location of the specific speaker is known.

11. The computer program product of claim 10, wherein the program code is executable to switch from the selective listening mode to the broad listening mode in response to either an end of the dialog or an activation word.

12. A method for automatic speech recognition (ASR) comprising:
employing a multi-mode voice-controlled user interface having a computer processor to conduct a speech dialog with one or more possible speakers by:
employing a broad listening mode which accepts speech inputs from the possible speakers without spatial filtering and has an associated limited broad mode recognition vocabulary; and
employing a selective listening mode which limits speech inputs to a specific speaker using spatial filtering and has an associated selective mode recognition vocabulary that is larger than the limited broad mode recognition vocabulary,
the user interface:
switching from the broad listening mode to the selective listening mode in response to one or more switching cues,
in the selective listening mode, engaging the specific speaker in a dialog using the selective mode recognition vocabulary, and
remaining in the selective listening mode so long as a location of the specific speaker is known.

13. The method according to claim 12, wherein the switching cues include one or more mode switching words from the speech inputs.

14. The method according to claim 12, wherein the switching cues include one or more dialog states in the speech dialog.

15. The method according to claim 12, wherein the switching cues include one or more visual cues from the possible speakers.

16. The method according to claim 12, wherein the selective listening mode includes using acoustic speaker localization for the spatial filtering.

17. The method according to claim 12, wherein the selective listening mode includes using image processing for the spatial filtering.

18. The method according to claim 12, wherein the user interface operates in selective listening mode simultaneously in parallel for each of a plurality of selected speakers, so that each of the plurality of selected speakers has its own selective listening mode and dialog with the user interface.

19. The method according to claim 12, wherein the user interface operates in both listening modes in parallel, such that the user interface accepts speech inputs in the broad listening mode, and at the same time accepts speech inputs from at least one selected speaker in at least one selective listening mode.

20. The method according to claim 12, including the user interface switching from the selective listening mode to the broad listening mode in response to either an end of the dialog or an activation word.

* * * * *